(12) United States Patent
Yang

(10) Patent No.: US 12,225,613 B2
(45) Date of Patent: Feb. 11, 2025

(54) METHOD AND APPARATUS FOR PROCESSING RADIO-LINK FAILURE, AND COMPUTER STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 330 days.

(21) Appl. No.: 17/779,541

(22) PCT Filed: Nov. 26, 2019

(86) PCT No.: PCT/CN2019/121035
§ 371 (c)(1),
(2) Date: May 24, 2022

(87) PCT Pub. No.: WO2021/102699
PCT Pub. Date: Jun. 3, 2021

(65) Prior Publication Data
US 2022/0418031 A1    Dec. 29, 2022

(51) Int. Cl.
*H04W 76/30* (2018.01)
*H04W 76/19* (2018.01)
*H04W 76/38* (2018.01)

(52) U.S. Cl.
CPC .......... *H04W 76/19* (2018.02); *H04W 76/38* (2018.02)

(58) Field of Classification Search
CPC . H04W 12/08; H04W 24/02; H04W 36/0079; H04W 36/305; H04W 76/18; H04W 76/19; H04W 76/38; H04W 76/30
See application file for complete search history.

(56) References Cited

U.S. PATENT DOCUMENTS

| | | | |
|---|---|---|---|
| 9,730,090 B2 * | 8/2017 | Johansson | H04W 24/04 |
| 10,225,756 B2 * | 3/2019 | Reider | H04W 24/10 |
| 2016/0345351 A1 * | 11/2016 | Bhattacharjee | H04W 56/0015 |
| 2017/0048898 A1 * | 2/2017 | Jung | H04W 36/0088 |
| 2017/0265242 A1 | 9/2017 | Yang | |
| 2020/0351731 A1 * | 11/2020 | Kim | H04W 76/27 |
| 2021/0051539 A1 * | 2/2021 | Zhang | H04W 36/38 |
| 2021/0368372 A1 * | 11/2021 | Chen | H04W 24/08 |

(Continued)

FOREIGN PATENT DOCUMENTS

| | | |
|---|---|---|
| CN | 105265004 A | 1/2016 |
| CN | 107484260 A | 12/2017 |

(Continued)

OTHER PUBLICATIONS

Ericsson, "RRC Connection Reestablishment Related Report after Radio Link Failure," Tdoc R2-1906896, 3GPP TSG-RAN WG2#106 (May 13-17, 2019).

(Continued)

*Primary Examiner* — Frank Duong
(74) *Attorney, Agent, or Firm* — Volpe Koenig

(57) ABSTRACT

A method for processing radio-link failure is disclosed. The method includes: recording by user equipment (UE), a reason for a link failure when user equipment (UE) releases a radio resource control (RRC) connection due to expiration of an inactivity timer; and reporting failure information comprising the reason for the link failure.

17 Claims, 8 Drawing Sheets

(56) References Cited

U.S. PATENT DOCUMENTS

2022/0150730 A1* 5/2022 Freda .................... H04L 1/1812
2022/0361275 A1* 11/2022 Da Silva ............... H04W 76/18

FOREIGN PATENT DOCUMENTS

| CN | 107645738 A | 1/2018 |
| CN | 108990138 A | 12/2018 |
| CN | 110022620 A | 7/2019 |
| WO | 2014007012 A1 | 1/2014 |

OTHER PUBLICATIONS

MediaTek Inc., "Report of Email Discussion [99#43][NB-IoT] RRC Connection Release," R2-1710795 (Oct. 2017).

* cited by examiner

METHOD AND APPARATUS FOR PROCESSING RADIO-LINK FAILURE, AND COMPUTER STORAGE MEDIUM

CROSS REFERENCE TO RELATED APPLICATION

The present application is a U.S. National Stage of International Application No. PCT/CN2019/121035, filed on Nov. 26, 2019, the contents of all of which are incorporated herein by reference in their entireties for all purposes.

TECHNICAL FIELD

The present disclosure relates to a communication technology, in particular to a method and apparatus for processing radio-link failure, and a computer storage medium.

BACKGROUND

To support direct communication between the user equipment (UE) and UE, Sidelink communication is introduced, and sometimes Sidelink is also referred to as direct link.

After a network transmits a radio resource control (RRC) connection release message, the UE possibly cannot receive the RRC connection release message due to poor signal quality, causing the UE to remain connected, while the network side has released the UE, resulting in a problem of inconsistency between states of the UE and the network. In order to solve the problem that the UE may incorrectly receive the RRC connection release message, an inactivity timer is introduced. The RRC connection of the UE is released in the absence of data transceiving in a period of time.

SUMMARY

The present disclosure provides a method and apparatus for processing radio-link failure, and a computer storage medium.

According to a first aspect of examples of the present disclosure, provided is a method for processing radio-link failure, performed by user equipment (UE), The method includes:

recording a reason for a link failure when user equipment (UE) releases a radio resource control (RRC) connection due to expiration of an inactivity timer; and reporting failure information including the reason for the link failure.

According to a second aspect of examples of the present disclosure, provided is a method for processing radio-link failure, performed by base station. The method includes:

issuing inactivity timer information configured for a UE; and receiving failure information including a reason for a link failure reported by the UE; where the reason for the link failure is recorded when RRC connection is released due to expiration of the inactivity timer.

According to a third aspect of examples of the present disclosure, provided is an apparatus for processing radio-link failure. The apparatus includes:

a processor, and
a memory configured to store an executable instruction;
where the processor is configured to implement, by executing the executable instruction, any one of the methods for processing radio-link failure applied to a UE-side technical solution.

According to a fourth aspect of examples of the present disclosure, provided is an apparatus for processing radio-link failure. The apparatus includes:

a processor, and
a memory configured to store an executable instruction;
where the processor is configured to implement, by executing the executable instruction, any one of the methods for processing radio-link failure applied to a base station-side technical solution.

According to a fifth aspect of examples of the present disclosure, provided is a non-transitory computer readable storage medium. The computer readable storage medium stores an executable instruction, and after the executable instruction is executed by a processor, any one of the aforementioned methods for processing radio-link failure is applied to a UE-side as a technical solution.

According to an sixth aspect of examples of the present disclosure, provided is a non-transitory computer readable storage medium. The computer readable storage medium stores an executable instruction, and after the executable instruction is executed by a processor, any one of the aforementioned methods for processing radio-link failure is applied to a base station-side as a technical solution.

It is to be understood that both the foregoing general description and the following detailed description are illustrative and explanatory and are not restrictive of the present disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the present disclosure.

DETAILED DESCRIPTION

Description will herein be made in detail to examples, examples of which are illustrated in the accompanying drawings. When the following description refers to the accompanying drawings, the same numbers in different accompanying drawings refer to the same or similar elements unless otherwise instructed. The implementation modes described in the following examples do not represent all implementation modes consistent with the present application. Rather, they are merely examples of apparatus and methods consistent with some aspects of examples of the present application as described in detail in the appended claims.

The term used in the examples of the present disclosure is for the purpose of describing particular examples merely and is not intended to be restrictive of the examples of the present disclosure. As used in the examples and the appended claims of the present disclosure, singular forms "a", "an" and "the" are intended to include plural forms as well, unless the context clearly indicates otherwise. It is to be understood that the term "and/or" as used herein refers to and encompasses any or all possible combinations of one or more of the associated listed items.

It is to be understood that although the terms first, second, third, etc. may be employed in the examples of the present disclosure to describe various information, such information should not be limited to these terms. These terms are merely used to distinguish the same type of information from each other. For example, first information may also be referred to as second information, and similarly, second information may also be referred to as first information, without departing from the scope of the examples of the present disclosure. The word "if" and "in case of" as used herein may be construed to mean "upon" or "when" or "in response to determining", depending on the context.

To support direct communication between the user equipment (UE) and UE, Sidelink communication is introduced, and sometimes Sidelink is also referred to as direct link.

After a network transmits a radio resource control (RRC) connection release message, the UE possibly cannot receive the RRC connection release message due to poor signal quality, causing the UE to remain connected, while the network side has released the UE, resulting in a problem of inconsistency between states of the UE and the network. In order to solve the problem that the UE may incorrectly receive the RRC connection release message, an inactivity timer is introduced. The RRC connection of the UE is released in the absence of data transceiving activity being detected within a period of time. However, when the UE releases the RRC connection to enter an idle state due to expiration of the inactivity timer, it is indicated that the current radio link quality is inferior, which disables receipt of the RRC connection release message of the network.

Figure 1:
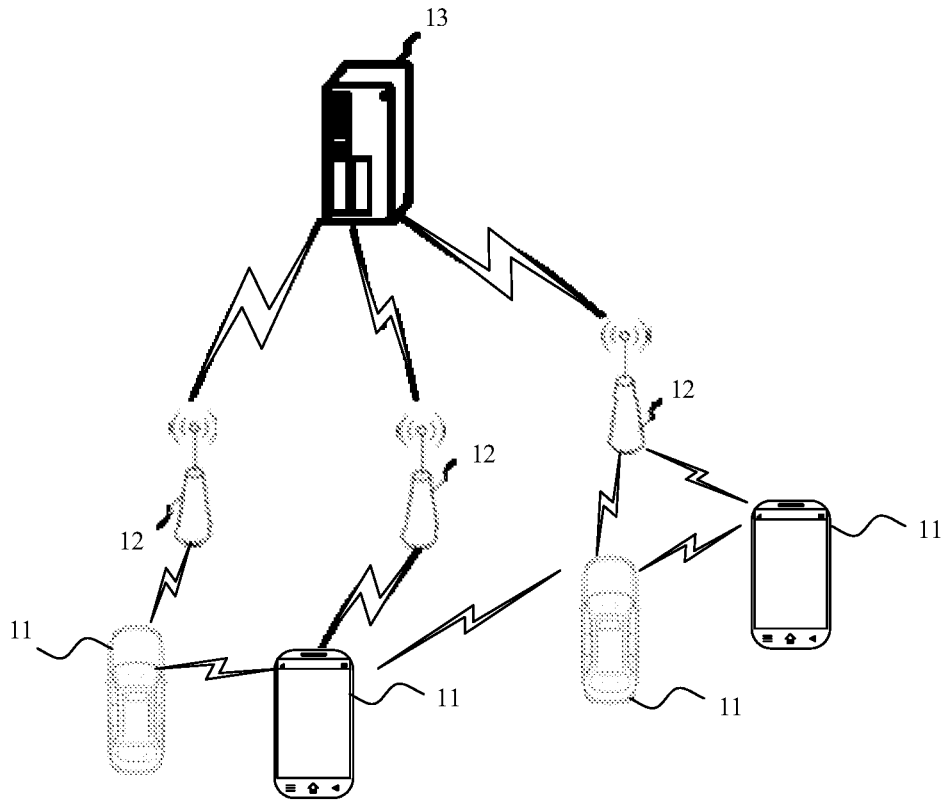
FIG. 1 is a structural schematic diagram of a radio communication system shown in an example.

With reference to FIG. 1, a structural schematic diagram of a radio communication system provided in an example of the present disclosure is shown. As shown in FIG. 1, the radio communication system is a communication system based on a cellular mobile communication technology. The radio communication system may include: several terminals 11 and several base stations 12.

The terminals 11 may be devices that provide speech and/or data connectivity for a user. Each of the terminals 11 may communicate with one or more core networks by means of a radio access network (RAN), and the terminal 11 may be an Internet of Things terminal, for example, a sensor device, a mobile telephone (or referred to as a "cellular" telephone), and a computer having an Internet of Things terminal, for example, may be a stationary, portable, pocket-sized, hand-held, computer-built, or vehicle-mounted device, for example, a station (STA), a subscriber unit, a subscriber station, a mobile station, a mobile, a remote station, an access point, a remote terminal, an access terminal, a user terminal, a user agent, a user device, or user equipment (UE). Alternatively, each of the terminal 11 may be a device of an unmanned aerial vehicle. Alternatively, each of the terminal 11 may be an in-vehicle device, for example, a trip computer with a radio communication function, or a radio communication device to which a trip computer is externally connected. Alternatively, each of the terminal 11 may be a roadside device, for example, a street lamp, a signal lamp, another roadside device, etc. with the radio communication function.

Each of the base stations 12 may be a network-side device in the radio communication system. The radio communication system may be the 4th generation mobile communication (4G) system, also referred to as a long term evolution (LTE) system; and alternatively, the radio communication system may also be a 5G system, also referred to as a new radio (NR) system or a 5G NR system. Alternatively, the radio communication system may also be a next generation system consecutive to the 5G system. An access network in the 5G system may be referred to as a new generation-radio access network (NG-RAN). Alternatively, the radio communication system may be a machine-type communication (MTC) system.

Each of the base stations 12 may be an evolved Node B (eNB) used in a 4G system. Alternatively, each of the base stations 12 may also be a next-generation Node B (gNB) using a central distributed architecture in a 5G system. When the base station 12 uses the central distributed architecture, it typically includes a central unit (CU) and at least two distributed units (DU). The central unit is provided with protocol stacks of a packet data convergence protocol (PDCP) layer, a radio link control (RLC) layer and a media access control (MAC) layer; and each distributed unit is provided with a protocol stack of a physical (PHY) layer. Examples of the present disclosure are not limited to the specific implementation modes of the base station 12.

A radio connection may be established between the base stations 12 and the terminals 11 by means of radio air interfaces. In different implementation modes, the radio air interface is a radio air interface based on a 4th generation mobile communication network technology (4G) standard; alternatively, the radio air interface is a radio air interface based on a 5th generation mobile communication network technology (5G) standard, for example, the radio air interface is a new radio; and alternatively, the radio air interface may also be a radio air interface based on a 5G-based next generation mobile communication network technology standard.

In some examples, an end to end (E2E) connection may also be established between the terminals 11, for example, vehicle to vehicle (V2V) communication, vehicle to infrastructure (V2I) communication, vehicle to pedestrian (V2P) communication, and other scenes in vehicle to everything (V2X).

In some examples, the above radio communication system may further include a network management device 13.

The several base stations 12 are respectively connected to the network management device 13. The network management device 13 may be a core network device in the radio communication system, for example, the network management device 13 may be a mobility management entity (MME) in an evolved packet core (EPC). Alternatively, the network management device may be another core network device, for example, a serving gate way (SGW), a public data network gate way (PGW), a policy and charging rules function (PCRF), a home subscriber server (HSS), etc. The examples of the present disclosure are not limited with respect to an implementation form of the network management device 13.

Various examples of the method of the present disclosure are proposed for reducing the possibility of radio link failure in a network based on the above radio communication system.

Figure 2:
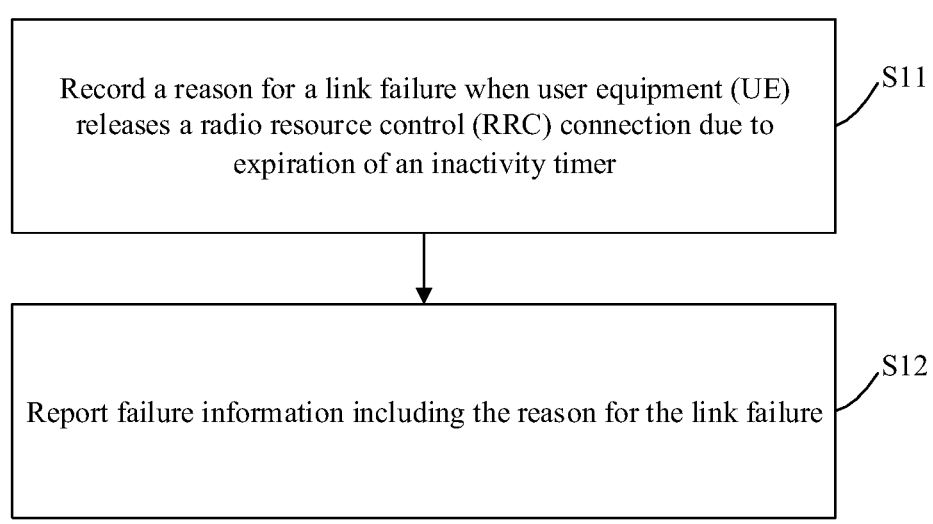
FIG. 2 is a first flowchart of a method for processing radio-link failure shown in an example.

FIG. 2 is a first flowchart of a method for processing radio-link failure shown in an example. As shown in FIG. 2, the method for processing radio-link failure applied to UE and includes steps as follows.

In S11, a reason for a link failure is recorded when user equipment (UE) releases a radio resource control (RRC) connection due to expiration of an inactivity timer.

The inactivity timer includes: a data inactivity timer and/or a sidelink inactivity timer.

Data in the data inactivity timer includes media access control (MAC) service data unit (SDU) data.

The reason for the link failure is that the inactivity timer expires.

In this way, when the UE releases the RRC connection due to expiration of the inactivity timer, it is determined that the UE has the radio link failure, and the reason for the link failure is recorded as expiration of the inactivity timer, such that the failure information including the reason for the link failure may be reported to a network subsequently, and the network may optimize the radio link according to the failure information.

In S12, failure information including the reason for the link failure is reported.

In this way, compared with the situation that no processing is carried out when UE releases a RRC connection due to expiration of the inactivity timer, by recording the reason for the link failure and reporting the failure information including the reason for the link failure, a base station may be facilitated to optimize a radio link according to the failure information, such that the possibility that the radio link fails in a network is reduced.

In some examples, reporting failure information including the reason for the link failure includes:
the failure information including the reason for the link failure is reported after the RRC connection is recovered.

In this way, the failure information including the reason for the link failure may be reported in time, such that the base station may know the reason for the link failure and solve the failure link as soon as possible.

In some examples, reporting the failure information including the reason for the link failure after the RRC connection is recovered includes:
a prompt message which indicates that the UE has the failure information is sent after the RRC connection is recovered;
a report instruction message returned based on the prompt message is received; and
the failure information including the reason for the link failure is reported based on the report instruction message.

In this way, after the report instruction message is received, the failure information including the reason for the link failure is reported, such that the problem that the base station does not successfully receive the failure information reported by the UE due to inappropriate report time is avoided.

In the above solution, the failure information further includes: timing duration information of the inactivity timer.

In the above solution, the failure information further includes: a serving cell identifier of a serving cell connected with the UE before the RRC connection is released, position information of the UE, a cell radio network temporary identifier (C-RNTI) provided by the serving cell for the UE, and a target cell identifier for handover.

In this way, the base station may conveniently determine the failure link and the reason for the link failure according to the failure information, and determine a measure for optimizing the failure link based on the reason for the link failure.

In the technical solution of the examples of the present disclosure, when UE releases an RRC connection due to expiration of an inactivity timer, a reason for a link failure is recorded; failure information including the reason for the link failure is reported. Compared with the situation that no processing is carried out when UE releases a RRC connection due to expiration of an inactivity timer, by recording the reason for the link failure and reporting the failure information including the reason for the link failure, a base station may be facilitated to optimize a radio link according to the failure information, such that the possibility that the radio link fails in a network is reduced.

Figure 3:
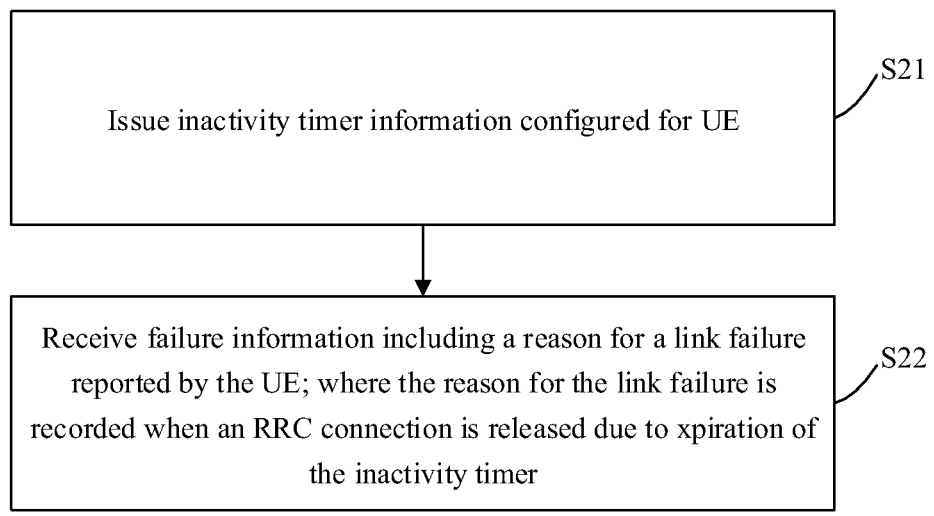
FIG. 3 is a second flowchart of a method for processing radio-link failure shown in an example.

FIG. 3 is a second flowchart of a method for processing radio-link failure shown in an example. As shown in FIG. 3, the method for processing radio-link failure is used in a base station and includes the following steps.

In S21, inactivity timer information configured for UE is issued.

The inactivity timer includes: a data inactivity timer and/or a sidelink inactivity timer.

The reason for the link failure is that the inactivity timer expires.

As one implementation mode, issuing inactivity timer information configured for UE further includes:
timing duration information of the inactivity timer information configured for UE is issued.

In this way, the UE may release the RRC connection conveniently when the inactivity timer expires, such that resource waste caused by long-time occupation of resources may be reduced.

In S22, failure information including a reason for a link failure reported by the UE is received; where the reason for the link failure is recorded when an RRC connection is released due to expiration of the inactivity timer.

In this way, the base station may be facilitated to optimize a radio link according to the failure information including the reason for the link failure and reported by the UE, such that the possibility that the radio link fails in the network is reduced.

In some examples, before failure information including a reason for a link failure reported by the UE is received, the method further includes:
a prompt message indicating the UE has failure information sent from the UE is received; and
a report instruction message is returned to the UE based on the prompt message, where the report instruction message is used for instructing to report the failure information.

In this way, the problem that the base station does not successfully receive the failure information reported by the UE due to inappropriate report time of the UE is avoided.

In the above solution, the failure information further includes timing duration information of the inactivity timer.

In the above solution, the failure information further includes a serving cell identifier of a serving cell connected with the UE before the RRC connection is released, position information of the UE, a C-RNTI provided by the serving cell for the UE, and a target cell identifier for handover.

In this way, the base station may conveniently determine the failure link and the reason for the link failure according to the failure information, and determine a measure for optimizing the failure link based on the reason for the link failure.

In the above solution, the method further includes:
a failure link and the reason for the link failure are determined according to the failure information, where the failure link is a radio link between a base station and the UE, and the reason for the link failure is RRC connection release caused by expiration of the inactivity timer; and
a measure for optimizing the failure link is determined based on the reason for the link failure.

Illustratively, the measure for optimizing the failure link includes, but is not limited to:
an antenna tilt is optimized, and base station transmitting power is increased.

In this way, the possibility that the radio link fails in the network may be reduced.

According to the technical solution provided in the example of the present disclosure, inactivity timer information configured for UE is issued; and failure information including a reason for a link failure and reported by the UE is received; where the reason for the link failure is recorded when an RRC connection is released due to expiration of an inactivity timer; and in this way, a base station may be facilitated to optimize a radio link according to the failure information including the reason for the link failure and reported by the UE, such that the possibility that the radio link fails in a network is reduced.

Figure 4:
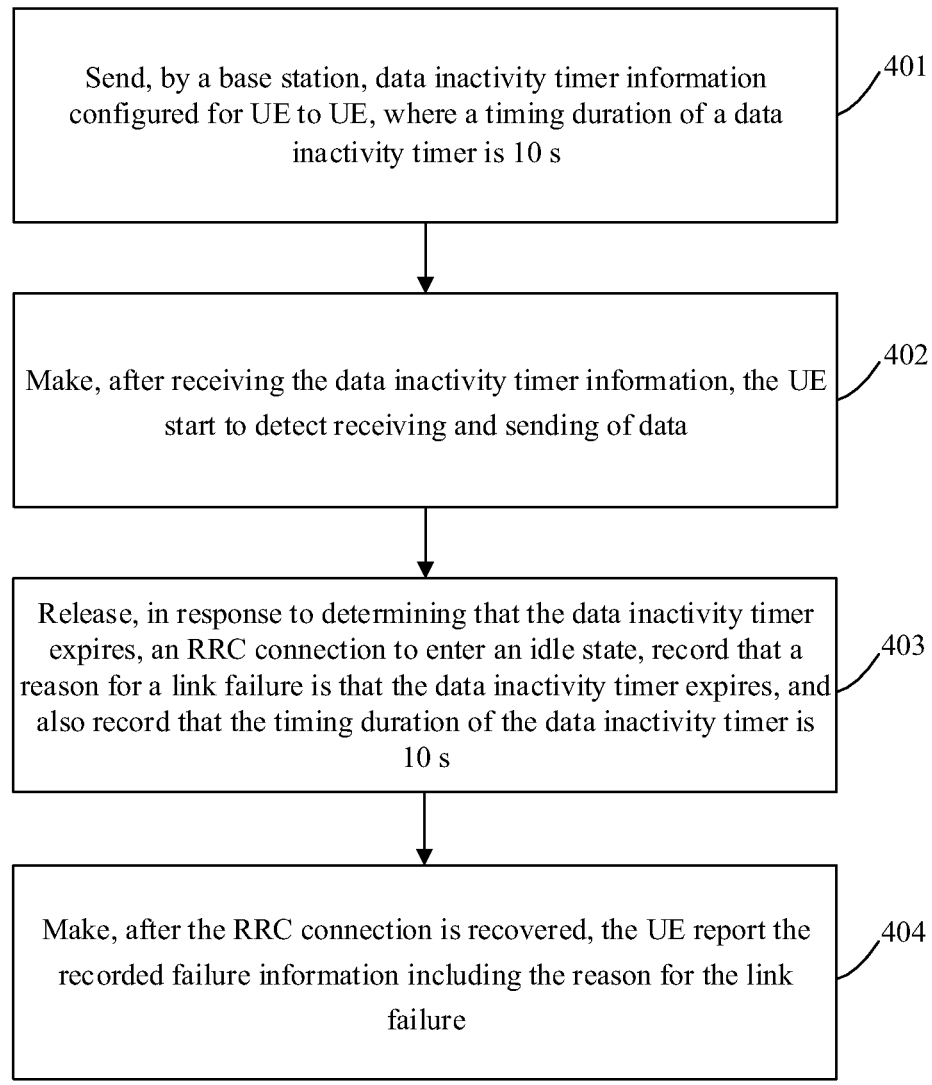
FIG. 4 is a first processing flowchart for reporting failure information as shown in an example.

FIG. 4 is a first processing flowchart for reporting failure information shown in an example. The flow includes the following steps.

Step 401, a base station sends data inactivity timer information configured for UE to the UE, where a timing duration of a data inactivity timer is, for example, 10 s (where s is seconds).

Step 402, after receiving the data inactivity timer information, the UE starts to detect receiving and sending of data.

Step 403, in response to determining that the data inactivity timer expires, an RRC connection is released to enter an idle state, it is recorded that a reason for a link failure is that the data inactivity timer expires, and it is also recorded that the timing duration of the data inactivity timer is 10 s.

Step 404, after the RRC connection is recovered, the UE reports the recorded failure information including the reason for the link failure.

According to the solution of the example, compared with the situation that no processing is carried out when the UE releases an RRC connection due to expiration of an inactivity timer, by recording the reason for the link failure and reporting the failure information including the reason for the link failure, a base station may be facilitated to optimize a radio link according to the failure information, such that the possibility that the radio link fails in a network is reduced.

It is to be noted that the flow and the timing duration are a schematic example implementation and these may be set or adjusted according to actual situations or design requirements.

Figure 5:
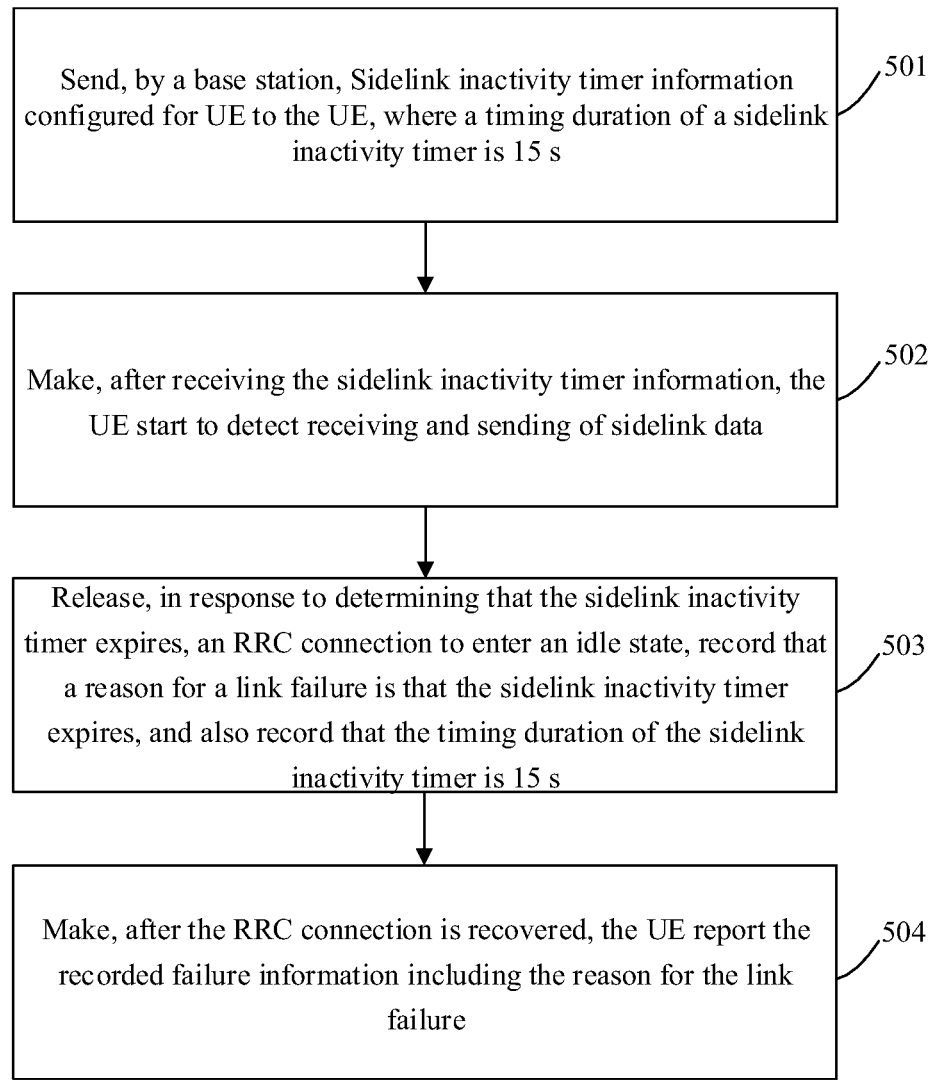
FIG. 5 is a second processing flowchart for reporting failure information as shown in an example.

FIG. 5 is a second processing flowchart for reporting failure information shown in an example. The flow includes the following steps.

Step 501, a base station sends sidelink inactivity timer information configured for UE to the UE, where a timing duration of a sidelink inactivity timer is 15 s.

Step 502, after receiving the sidelink inactivity timer information, the UE starts to detect receiving and sending of sidelink data.

Step 503, in response to determining that the sidelink inactivity timer expires, an RRC connection is released to enter an idle state, it is recorded that a reason for a link failure is that the sidelink inactivity timer expires, and it is also recorded that the timing duration of the sidelink inactivity timer is 15 s.

Step 504, after the RRC connection is recovered, the UE reports the recorded failure information including the reason for the link failure.

According to the solution of the example, compared with the situation that no processing is carried out when UE releases an RRC connection due to expiration of a sidelink inactivity timer, by recording the reason for the link failure and reporting the failure information including the reason for the link failure, a base station may be facilitated to optimize a radio link according to the failure information, such that the possibility that the radio link fails in a network is reduced.

It is to be noted that the flow and the timing duration are schematic and may be set or adjusted according to actual situations or design requirements.

Figure 6:
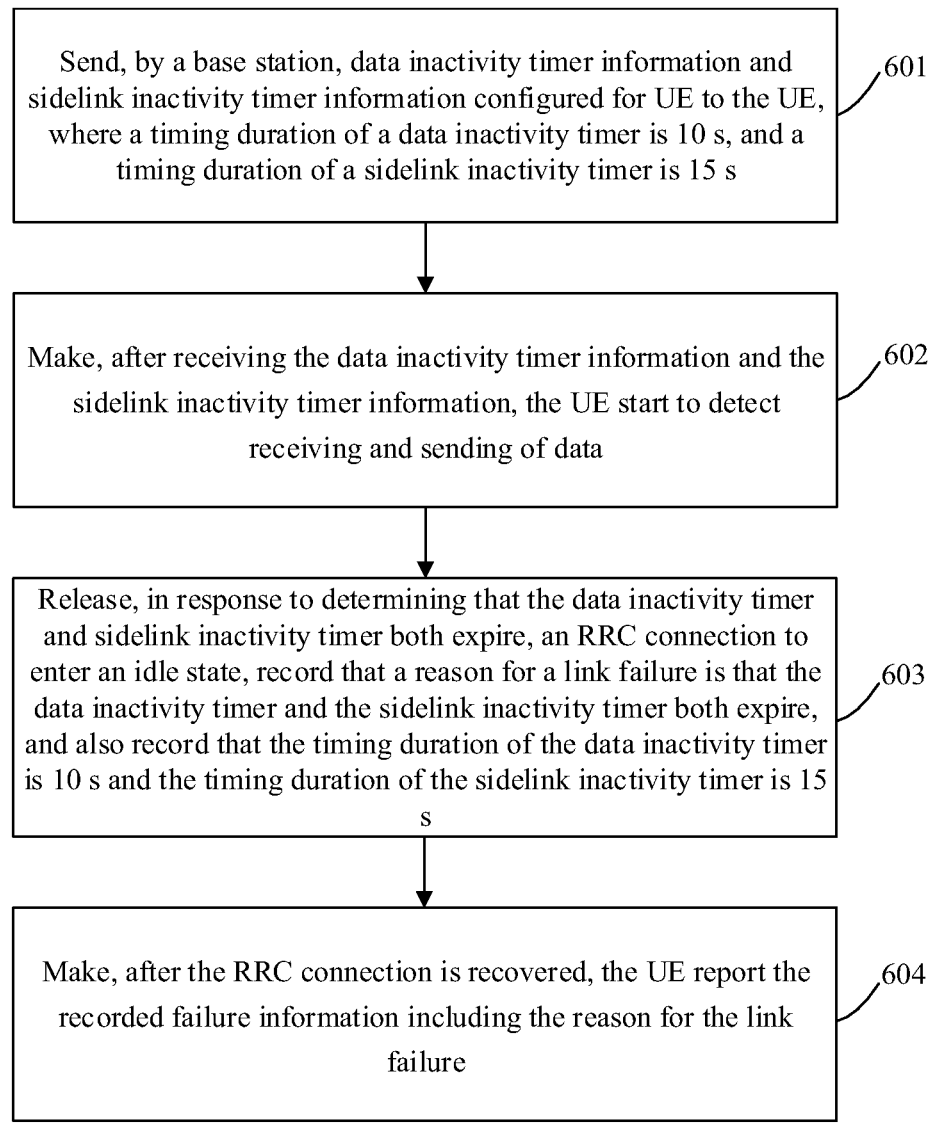
FIG. 6 is a third processing flowchart for reporting failure information as shown in an example.

FIG. 6 is a third processing flowchart for reporting failure information shown in an example. The flow includes the following steps.

Step 601, a base station sends data inactivity timer information and sidelink inactivity timer information configured for UE to the UE, where a timing duration of a data inactivity timer is 10 s, and a timing duration of a sidelink inactivity timer is 15 s.

Step 602, after receiving the data inactivity timer information and the sidelink inactivity timer information, the UE starts to detect receiving and sending of data.

Step 603, in response to determining that the data inactivity timer and sidelink inactivity timer both expire, an RRC connection is released to enter an idle state, it is recorded that a reason for a link failure is that the data inactivity timer and the sidelink inactivity timer both expire, and it is also recorded that the timing duration of the data inactivity timer is 10 s and the timing duration of the sidelink inactivity timer is 15 s.

Step 604, after the RRC connection is recovered, the UE reports the recorded failure information including the reason for the link failure.

According to the solution of the example, compared with the situation that no processing is carried out when the UE releases the RRC connection due to expiration of the sidelink inactivity timer and the data inactivity timer both, by recording the reason for the link failure and reporting the failure information including the reason for the link failure, a base station may be facilitated to optimize a radio link according to the failure information, such that the possibility that the radio link fails in a network is reduced.

It is to be noted that the flow and the timing duration are schematic and may be set or adjusted according to actual situations or design requirements.

Figure 7:
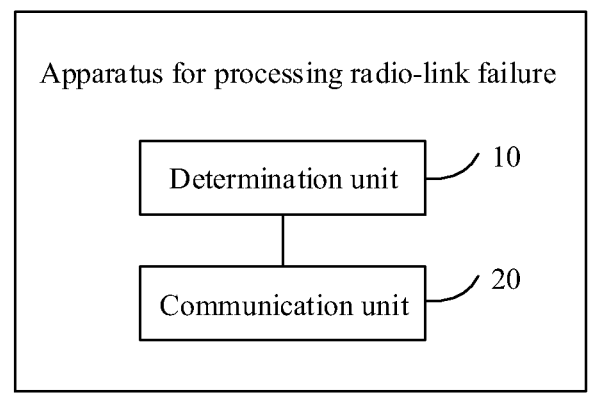
FIG. 7 is a first block diagram of an apparatus for processing radio-link failure shown in an example.

FIG. 7 is a first block diagram of an apparatus for processing radio-link failure shown in an example. The apparatus for processing radio-link failure is configured to a UE side. With reference to FIG. 7, the apparatus includes a determination unit 10 and a communication unit 20.

The determination unit 10 is configured to record a reason for a link failure when UE releases an RRC connection due to expiration of an inactivity timer; and
the communication unit 20 is configured to report failure information including the reason for the link failure.

In the above solution, the inactivity timer includes: a data inactivity timer and/or a sidelink inactivity timer.

As one implementation mode, the communication unit 20 is configured to
report the failure information including the reason for the link failure after the RRC connection is recovered.

As one implementation mode, the communication unit 20 is configured to
send, after the RRC connection is recovered, a prompt message which indicates that the UE has the failure information;
receive a report instruction message returned based on the prompt message; and
report the failure information including the reason for the link failure based on the report instruction message.

In the above solution, the failure information further includes: timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

With respect to the apparatus in the above example, specific ways in which the various modules perform operations have been described in detail in the examples relating to the method, and will not be described in detail herein.

In practical use, specific structures of the determination unit 10 and the communication unit 20 may be implemented by a central processing unit (CPU), a micro controller unit (MCU), a digital signal processor (DSP), a programmable logic controller (PLC), etc. in an apparatus for processing radio-link failure or UE to which the apparatus for processing radio-link failure belongs.

The apparatus for processing radio-link failure according to the example may be configured to the UE side.

It is to be understood by those skilled in the art that functions of the processing modules in the apparatus for processing radio-link failure in the example of the present disclosure may be understood with reference to the above related description of the method for processing radio-link failure applied to the UE side, and each processing module in the apparatus for processing radio-link failure may be achieved by means of an analog circuit for implementing the functions described in the example of the present disclosure, and may also be achieved by means of running software, executing the functions described in the example of the present disclosure, on a terminal.

According to the apparatus for processing radio-link failure in the example of the present disclosure, compared with the situation that no processing is carried out when UE releases a RRC connection due to expiration of an inactivity timer, by recording the reason for the link failure and reporting the failure information including the reason for the link failure, a base station may be facilitated to optimize a radio link according to the failure information, such that the possibility that the radio link fails in a network is reduced.

Figure 8:
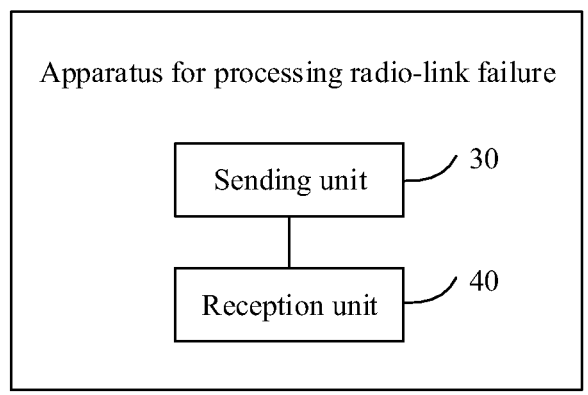
FIG. 8 is a second block diagram of an apparatus for processing radio-link failure shown in an example.

FIG. 8 is a second block diagram of an apparatus for processing radio-link failure shown in an example. The apparatus for processing radio-link failure is configured to a base station side. With reference to FIG. 8, the apparatus includes a sending unit 30 and a reception unit 40.

The sending unit 30 is configured to issue inactivity timer information configured for the UE; and
the reception unit 40 is configured to receive failure information including a reason for a link failure reported by the UE; where the reason for the link failure is recorded when an RRC connection is released due to expiration of the inactivity timer.

In the above solution, the inactivity timer includes: a data inactivity timer and/or a sidelink inactivity timer.

In the above solution, the reception unit 40 is configured to receive a prompt message indicating the UE has failure information sent from the UE; and
the sending unit 30 is configured to return a report instruction message to the UE based on the prompt message, where the report instruction message is used for instructing to report the failure information.

In the above solution, the failure information further includes timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

In the above solution, the apparatus further includes:
a processing unit 50 (not shown in FIG. 8) configured to determine a failure link and the reason for the link failure according to the failure information, where the failure link is a radio link between a base station and the UE, and the reason for the link failure is RRC connection release caused by expiration of the inactivity timer; and
determine, based on the reason for the link failure, a measure for optimizing the failure link.

With respect to the apparatus in the above example, specific ways in which the various modules perform operations have been described in detail in the examples relating to the method, and will not be described in detail herein.

In practical use, specific structures of the sending unit 30, the reception unit 40 and the processing unit 50 may be achieved by the apparatus for processing radio-link failure or a CPU, an MCU, a DSP, a PLC, etc. in a base station to which the apparatus for processing radio-link failure belongs.

The apparatus for processing radio-link failure according to the example may be configured for implementation on the base station side.

It is to be understood by those skilled in the art that functions of the processing modules in the apparatus for processing radio-link failure in the example of the present disclosure may be understood with reference to the above related description of the method for processing radio-link failure applied to the base station side, and each processing module in the apparatus for processing radio-link failure may be achieved by means of an analog circuit for implementing the functions described in the example of the present disclosure, and may also be achieved by means of running software, executing the functions described in the example of the present disclosure, on a terminal.

According to the apparatus for processing radio-link failure in the example of the present disclosure, compared with the situation that no processing is carried out when UE releases a RRC connection due to expiration of an inactivity timer, by recording the reason for the link failure and reporting the failure information including the reason for the link failure, a base station may be facilitated to optimize a radio link according to the failure information, such that the possibility that the radio link fails in a network is reduced.

Figure 9:
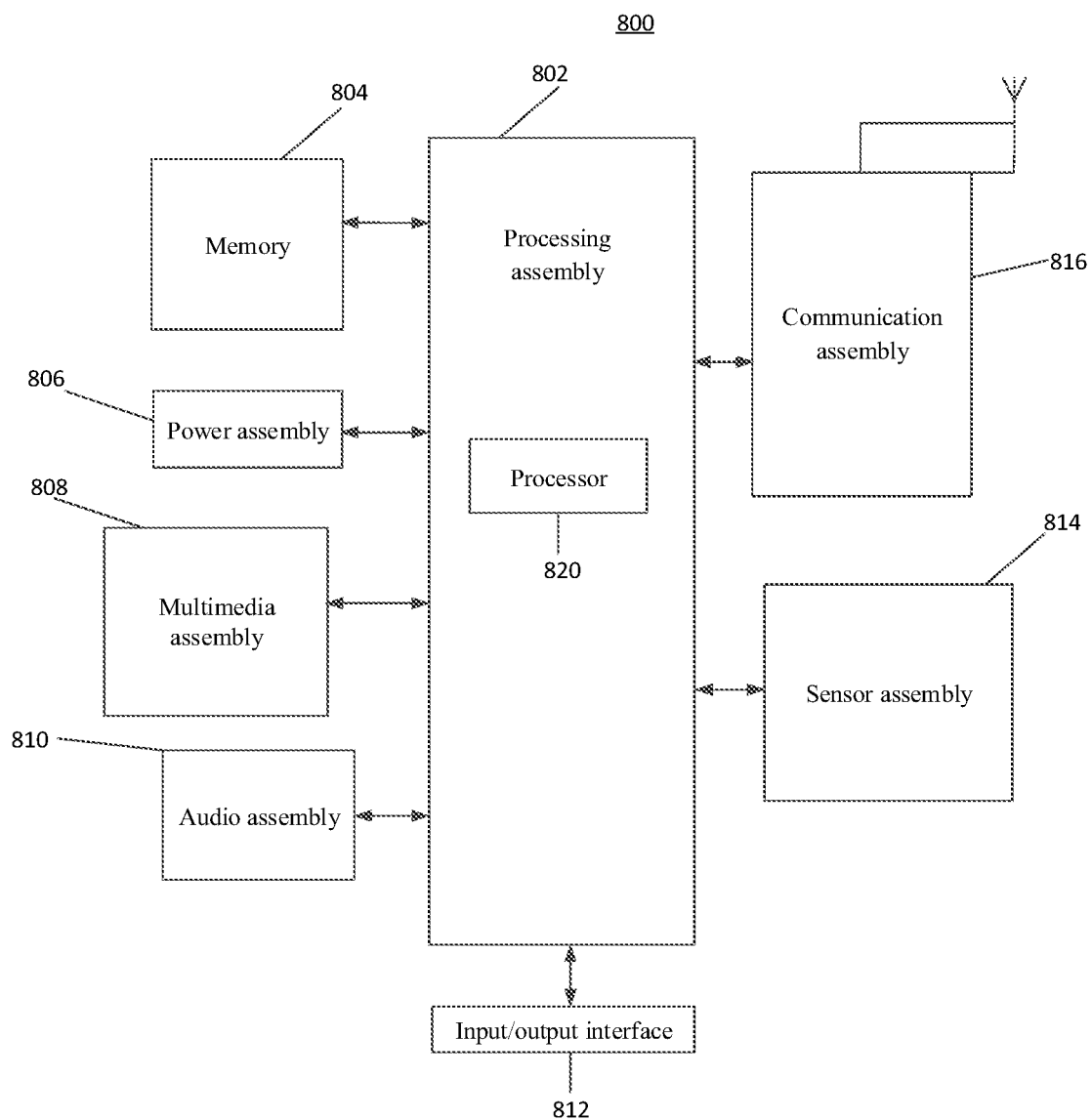
FIG. 9 is a first block diagram of an apparatus 800 for implementing processing of a radio link failure shown in an example.

FIG. 9 is a block diagram of an apparatus 800 for implementing processing of a radio link failure shown in an example. For example, the apparatus 800 may be a mobile phone, a computer, a digital broadcast terminal, a messaging device, a gaming console, a tablet device, a medical device, a fitness device, a personal digital assistant, etc.

With reference to FIG. 9, the apparatus 800 may include one or more of a processing assembly 802, a memory 804, a power assembly 806, a multimedia assembly 808, an audio assembly 810, an input/output (I/O) interface 812, a sensor assembly 814, and a communication assembly 816.

The processing assembly 802 generally controls overall operation of the apparatus 800, for example, operations associated with display, phone calls, data communications, camera operations, and recording operations. The processing assembly 802 may include one or more processors 820 to execute an instruction to complete all or part of the steps of the method above. Moreover, the processing assembly 802 may include one or more modules to facilitate interaction between the processing assembly 802 and other assemblies. For example, the processing assembly 802 may include the multimedia module to facilitate interaction between the multimedia assembly 808 and the processing assembly 802.

The memory 804 is configured to store various types of data to support an operation on the apparatus 800. Examples of such data include an instruction, operated on the apparatus 800, for any application or method, contact data, phonebook data, messages, pictures, video, etc. The memory 804 may be implemented by any type of volatile or non-volatile memory device, or their combination, for example, a static random-access memory (SRAM), an electrically-erasable programmable read only memory (EEPROM), an erasable programmable read only memory (EPROM), a programmable read-only memory (PROM), read only memory (ROM), a magnetic memory, a flash memory, a magnetic or an optical disk.

The power assembly 806 provides power for various assemblies of the apparatus 800. The power assembly 806 may include a power management system, one or more power sources, and other assemblies associated with power generating, managing, and distributing for the apparatus 800.

The multimedia assembly 808 includes a screen that provides an output interface between the apparatus 800 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia assembly 808 includes a front-facing camera and/or a rear-facing camera. When the apparatus 800 is in an operational mode, for example, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 810 is configured to output and/or input an audio signal. For example, the audio assembly 810 includes a microphone (MIC), configured to receive an external audio signal when the apparatus 800 is in the operational mode, for example, a calling mode, a recording mode, and a speech recognition mode. The received audio signal may be further stored in the memory 804 or transmitted via the communication assembly 816. In some examples, the audio assembly 810 further includes a speaker for outputting the audio signal.

The I/O interface 812 provides an interface between the processing assembly 802 and a peripheral interface module, which may be a keyboard, a click wheel, a button, etc. These buttons may include but are not limited to a home button, a volume button, a start button, and a lock button.

The sensor assembly 814 includes one or more sensors for providing state assessments of various aspects for the apparatus 800. For example, the sensor assembly 814 may detect an on/off state of the apparatus 800 and relative positioning of the assemblies. For example, the assemblies are a display and a keypad of the apparatus 800. The sensor assembly 814 may also detect a change in position of the apparatus 800 or an assembly of the apparatus 800, the presence or absence of contact between the user and the apparatus 800, orientation or acceleration/deceleration of the apparatus 800, and temperature variation of the apparatus 800. The sensor assembly 814 may include a proximity sensor configured to detect presence of nearby objects in the absence of any physical contact. The sensor assembly 814 may also include a light sensor, for example, a complementary metal oxide semiconductor (CMOS) or a charge-coupled device (CCD) image sensor, for use in imaging applications. In some examples, the sensor assembly 814 may also include an acceleration sensor, a gyroscopic sensor, a magnetic sensor, a pressure sensor, or a temperature sensor.

The communication assembly 816 is configured to facilitate communications between the apparatus 800 and other device in a wired or wireless mode. The apparatus 800 may access a wireless network based on a communication standard, for example, Wi-Fi, 2G, or 3G, or their combination. In an example, the communication assembly 816 receives a broadcast signal or broadcast related information from an external broadcast management system via a broadcast channel. In an example, the communication assembly 816 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth® (BT) technology, and other technologies.

In an example, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, and is configured to execute the method for processing radio-link failure applied to the user equipment side.

In the example, further provided is a non-transitory computer-readable storage medium including an executable instruction, for example, a memory 804 including an executable instruction, and the executable instruction may be executed by the processor 820 of the apparatus 800 so as to execute the method above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 10:
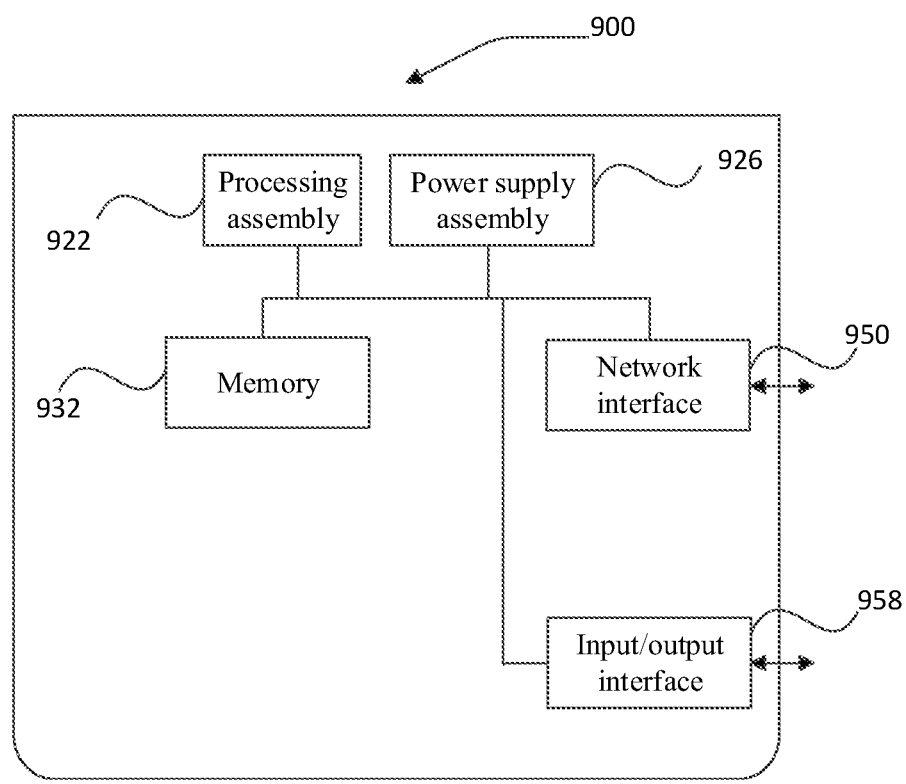
FIG. 10 is a second block diagram of an apparatus 900 for implementing processing of a radio link failure shown in an example.

FIG. 10 is a block diagram of an apparatus 900 for processing of a radio link failure shown in an example. For example, the apparatus 900 may be provided as a server. With reference to FIG. 10, the apparatus 900 includes a processing assembly 922, and further includes one or more processors, and memory resources represented by a memory 932 for storing an instruction, for example, an application program, executable by the processing assembly 922. The application program stored in the memory 932 may include one or more modules, each of which corresponds to a set of instructions. Further, the processing assembly 922 is configured to execute the instructions to implement the above method for processing radio-link failure applied to the base station side.

The apparatus 900 may further include a power supply assembly 926 configured to implement power supply management of the apparatus 900, a wired or radio network interface 950 configured to connect the apparatus 900 to a network, and an input/output (I/O) interface 958. The apparatus 900 may operate an operating system stored in the memory 932, such as Windows Server™, Mac OS X™, Unix™, Linux™, FreeBSD™, etc.

The technical solutions described in the examples of the present disclosure may be combined at will without conflict.

Other examples of the present disclosure will readily occur to those skilled in the art upon consideration of the specification and practical disclosure. The present application is intended to cover any variations, uses, or adaptations of the present disclosure, and these variations, uses, or adaptations follow general principles of the present disclosure and include common general knowledge or customary technical means in the technical field not disclosed in the present disclosure. The specification and examples are considered as illustrative merely, and a true scope and spirit of the present disclosure are indicated by the following claims.

It is to be understood that the present disclosure is not limited to the precise structure that has been described above and shown in the accompanying drawings, and that various modifications and changes may be made without departing from its scope. The scope of the present disclosure is limited only by the appended claims.

Additional non-limiting examples of the disclosure include the following.

According to a first aspect of examples of the present disclosure, provided is a method for processing radio-link failure, performed by user equipment (UE), The method includes:
  recording a reason for a link failure when user equipment (UE) releases a radio resource control (RRC) connection due to expiration of an inactivity timer; and
  reporting failure information including the reason for the link failure.

In the above solution, the inactivity timer includes: a data inactivity timer and/or a sidelink inactivity timer.

In the above solution, reporting failure information including the reason for the link failure includes:
  reporting the failure information including the reason for the link failure after the RRC connection is recovered.

In the above solution, reporting the failure information including the reason for the link failure after the RRC connection is recovered includes:
  sending, after the RRC connection is recovered, a prompt message which indicates that the UE has the failure information;
  receiving a report instruction message returned based on the prompt message; and
  reporting the failure information including the reason for the link failure based on the report instruction message.

In the above solution, the failure information further includes: timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

According to a second aspect of examples of the present disclosure, provided is a method for processing radio-link failure, performed by base station, The method includes:
  issuing inactivity timer information configured for UE; and
  receiving failure information including a reason for a link failure reported by the UE; where the reason for the link failure is recorded when RRC connection is released due to expiration of the inactivity timer.

In the above solution, the inactivity timer includes: a data inactivity timer and/or a sidelink inactivity timer.

In the above solution, before receiving failure information including the reason for a link failure reported by the UE, the method further includes:
  receiving a prompt message indicating the UE has failure information sent from the UE; and
  returning a report instruction message to the UE based on the prompt message, where the report instruction message is used for instructing to report the failure information.

In the above solution, the failure information further includes timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

In the above solution, the method further includes:
  determining a failure link and the reason for the link failure according to the failure information, wherein the failure link is a radio link between a base station and the UE, and the reason for the link failure is RRC connection release caused by expiration of the inactivity timer; and
  determining, based on the reason for the link failure, a measure for optimizing the failure link.

According to a third aspect of examples of the present disclosure, provided is an apparatus for processing radio-link failure. The apparatus includes:
  a determination unit configured to record a reason for a link failure when user equipment (UE) releases a radio resource control (RRC) connection due to expiration of an inactivity timer; and
  a communication unit configured to report failure information including the reason for the link failure.

In the above solution, the inactivity timer includes: a data inactivity timer and/or a sidelink inactivity timer.

In the above solution, the communication unit is configured to:
  report the failure information including the reason for the link failure after the RRC connection is recovered.

In the above solution, the communication unit is configured to:
  send, after the RRC connection is recovered, a prompt message which indicates that the UE has the failure information;
  receive a report instruction message returned based on the prompt message; and
  report the failure information including the reason for the link failure based on the report instruction message.

In the above solution, the failure information further includes: timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

According to a fourth aspect of examples of the present disclosure, provided is an apparatus for processing radio-link failure. The apparatus includes:
- a sending unit configured to issue inactivity timer information configured for the UE; and
- a reception unit configured to receive failure information including a reason for a link failure reported by the UE; where the reason for the link failure is recorded when RRC connection is released due to expiration of the inactivity timer.

In the above solution, the inactivity timer includes: a data inactivity timer and/or a sidelink inactivity timer.

In the above solution, the reception unit is configured to receive a prompt message indicating the UE has failure information sent from the UE; and
- the sending unit is configured to return a report instruction message to the UE based on the prompt message, where the report instruction message is used for instructing to report the failure information.

In the above solution, the failure information further includes timing duration information of the inactivity timer.

In the above solution, the failure information further includes a serving cell identifier of a serving cell connected with the UE before the RRC connection is released, position information of the UE, a cell radio network temporary identifier (C-RNTI) provided by the serving cell for the UE, and a target cell identifier for handover.

In the above solution, the apparatus further includes:
a processing module configured to:
determine a failure link and the reason for the link failure according to the failure information, where the failure link is a radio link between a base station and the UE, and the reason for the link failure is RRC connection release caused by expiration of the inactivity timer; and
determine, based on the reason for the link failure, a measure for optimizing the failure link.

According to a fifth aspect of examples of the present disclosure, provided is an apparatus for processing radio-link failure. The apparatus includes:
a processor, and
a memory configured to store an executable instruction;
where the processor is configured to implement, by executing the executable instruction, any one of the methods for processing radio-link failure applied to a UE-side technical solution.

According to a sixth aspect of examples of the present disclosure, provided is an apparatus for processing radio-link failure. The apparatus includes:
a processor, and
a memory configured to store an executable instruction;
where the processor is configured to implement, by executing the executable instruction, any one of the methods for processing radio-link failure applied to a base station-side technical solution.

According to a seventh aspect of examples of the present disclosure, provided is a computer storage medium. The computer storage medium stores an executable instruction, and after the executable instruction is executed by a processor, any one of the aforementioned methods for processing radio-link failure applied to a UE-side technical solution.

According to an eighth aspect of examples of the present disclosure, provided is a computer storage medium. The computer storage medium stores an executable instruction, and after the executable instruction is executed by a processor, any one of the aforementioned methods for processing radio-link failure applied to a base station-side technical solution.

What is claimed is:

1. A method for processing radio-link failure, performed by user equipment (UE) comprising:
recording a reason for a link failure when user equipment (UE) releases a radio resource control (RRC) connection due to expiration of an inactivity timer; and
reporting failure information comprising the reason for the link failure after the RRC connection is recovered.

2. The method according to claim 1, wherein the inactivity timer comprises: a data inactivity timer and/or a sidelink inactivity timer.

3. A non-transitory computer storage medium, storing an executable instruction, wherein when the executable instruction is executed by a processor, the processor implements the method for processing the radio-link failure according to claim 1.

4. The method for processing the radio-link failure according to claim 1, wherein reporting the failure information comprising the reason for the link failure after the RRC connection is recovered comprises:
sending, after the RRC connection is recovered, a prompt message which indicates that the UE has the failure information;
receiving a report instruction message returned based on the prompt message; and
reporting the failure information comprising the reason for the link failure based on the report instruction message.

5. The method for processing the radio-link failure according to claim 1, wherein the failure information further comprises: timing duration information of the inactivity timer.

6. The method for processing the radio-link failure according to claim 1, wherein the failure information further comprises a serving cell identifier of a serving cell connected with the UE before the RRC connection is released, position information of the UE, a cell radio network temporary identifier (C-RNTI) provided by the serving cell for the UE, and a target cell identifier for handover.

7. A method for processing radio-link failure, performed by base station, comprising:
issuing inactivity timer information for an inactivity timer configured for user equipment (UE);
receiving a prompt message indicating the UE has failure information sent from the UE;
returning a report instruction message to the UE based on the prompt message, wherein the report instruction message is used for instructing to report the failure information; and
receiving failure information comprising a reason for a link failure reported by the UE; wherein the reason for the link failure is recorded when a radio resource control (RRC) connection is released due to expiration of the inactivity timer.

8. The method for processing the radio-link failure according to claim 7, wherein the inactivity timer comprises: a data inactivity timer and/or a sidelink inactivity timer.

9. An apparatus for processing the radio-link failure, comprising:
a processor, and
a memory configured to store an executable instruction, and wherein the processor executes the executable instruction to implement the method for processing the radio-link failure according to claim 7.

10. The method for processing the radio-link failure according to claim 7, wherein the failure information further comprises timing duration information of the inactivity timer.

11. The method for processing the radio-link failure according to claim 7, wherein the failure information further comprises a serving cell identifier of a serving cell connected with the UE before the RRC connection is released, position information of the UE, a cell radio network temporary identifier (C-RNTI) provided by the serving cell for the UE, and a target cell identifier for handover.

12. The method for processing the radio-link failure according to claim 7, wherein the method further comprises:
  determining a failure link and the reason for the link failure according to the failure information, wherein the failure link is a radio link between a base station and the UE, and the reason for the link failure is RRC connection release caused by expiration of the inactivity timer; and
  determining, based on the reason for the link failure, a measure for optimizing the failure link.

13. A non-transitory computer storage medium, storing an executable instruction, wherein when the executable instruction is executed by a processor, the processor implements the method for processing the radio-link failure according to claim 7.

14. An apparatus for processing radio-link failure, comprising:
  a processor; and
  a memory configured to store an executable instruction, wherein the processor is configured to:
    record a reason for a link failure when user equipment (UE) releases a radio resource control (RRC) connection due to expiration of an inactivity timer, and
    report failure information comprising the reason for the link failure after the RRC connection is recovered.

15. The apparatus for processing the radio-link failure according to claim 14, wherein the inactivity timer comprises at least one of a data inactivity timer or a sidelink inactivity timer.

16. The apparatus for processing the radio-link failure according to claim 14, the processor is configured to:
  send, after the RRC connection is recovered, a prompt message which indicates that the UE has the failure information;
  receive a report instruction message returned based on the prompt message; and
  report the failure information comprising the reason for the link failure based on the report instruction message.

17. The apparatus for processing the radio-link failure according to claim 14, wherein the failure information further comprises: timing duration information of the inactivity timer.

* * * * *